T. ZIMMERMAN.
AXLE.
APPLICATION FILED NOV. 28, 1919.
1,438,570. Patented Dec. 12, 1922.
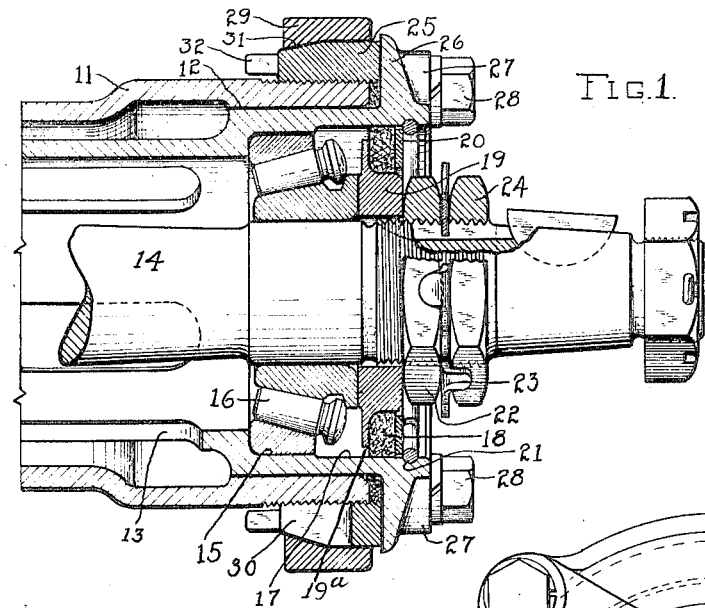
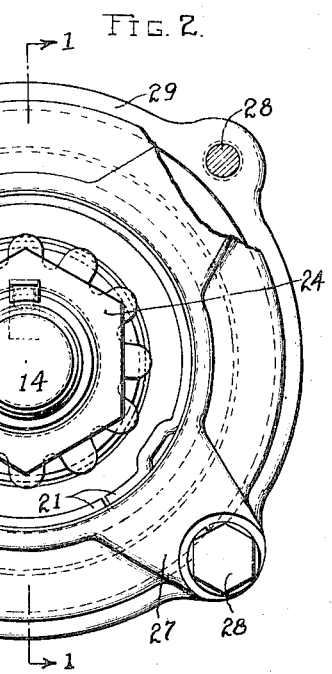
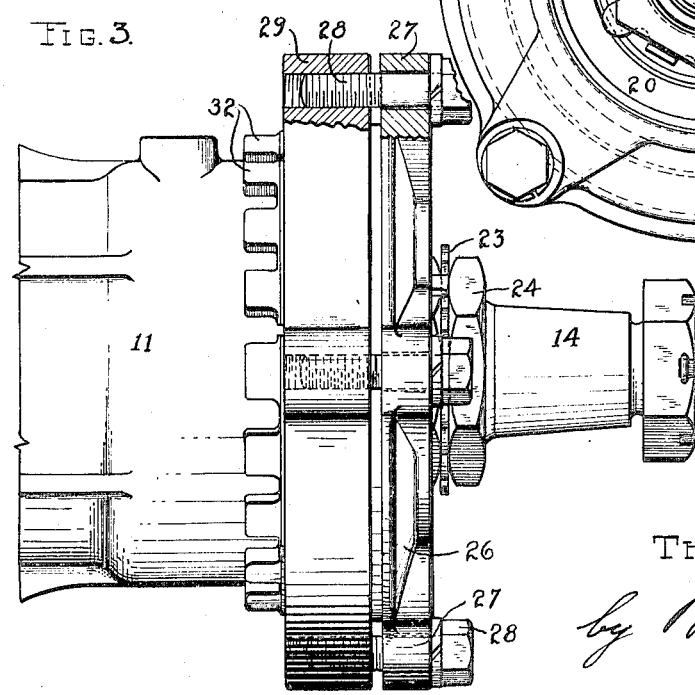
Inventor
THOMAS ZIMMERMAN.

Patented Dec. 12, 1922.

1,438,570

UNITED STATES PATENT OFFICE.

THOMAS ZIMMERMAN, OF CLEVELAND, OHIO, ASSIGNOR TO THE STANDARD PARTS COMPANY, OF CLEVELAND, OHIO, A CORPORATION OF OHIO.

AXLE.

Application filed November 28, 1919. Serial No. 341,192.

*To all whom it may concern:*

Be it known that I, THOMAS ZIMMERMAN, a citizen of the United States, and a resident of Cleveland, county of Cuyahoga, State of Ohio, have invented certain new and useful Improvements in Axles, of which the following is a specification.

This invention relates to driving axles for motor vehicles and more particularly to the pinion shaft mounting. It is one of the objects of the invention to provide a cage for supporting the pinion shaft and its bearings, and readily accessible means for adjusting said cage relatively to the gear driven by the pinion, and to also provide such a construction which will permit access to the means for adjusting the bearings of the pinion shaft. Another object of the invention is to provide means for securely clamping adjusting means of this type in adjusted position, and a still further object is the provision of suitable means to retain lubricant in the axle housing and prevent the entry of dirt and moisture.

Other objects of the invention and the features of novelty will be apparent from the following description, when taken in connection with the accompanying drawings, in which:—

Figure 1 is a fragmentary vertical section through a portion of an axle housing and cooperating parts embodying my invention, the section being taken on the line 1—1 of Fig. 2;

Fig. 2 is an end elevation of the structure shown in Fig. 1, a part thereof being broken away to more clearly disclose the structure; and Fig. 3 is a fragmentary side elevataion showing the structure as rotated slightly from the position shown in Fig. 2.

In the drawings, 11 indicates an extension of the axle housing of a motor vehicle, such extension being provided with a cylindrical bore or opening 12, to receive the cage 13 in which the pinion shaft 14 is carried, so that the shaft with its bearings and adjusting means, together with the cage, may be removed as a unit to facilitate assembly or adjustment, this construction being an improvement in the arrangement for adjusting and securing the cage, as disclosed in my Patent No. 1,369,210, granted February 22, 1921. Suitable means, which will be presently specifically described, are provided on the exterior of the housing for adjusting the cage axially in the housing, such means being so constructed as to be readily accessible and also so as to permit ready access to the bearing adjusting means on the pinion shaft.

The cage 13 is formed with a bearing seat 15 to receive the bearing, indicated generally at 16, which supports the outer end of the shaft 14, it being understood that the inner end of the shaft is likewise suitably supported in the cage. The cage may also be counterbored, as shown at 17, to facilitate the assembly of the bearing 16 in its seat, and a packing ring 18 is provided to cooperate with the counterbore 17 to retain the lubricant and prevent the entrance of dust and moisture. A ring 19 surrounds the shaft 14 adjacent the bearing 16 and has a flange 19ª extending outwardly therefrom, and the packing ring 18 cooperates with this flange, being held in position by a packing washer 20 and a split retaining ring 21 which engages the washer 20 and is sprung into a shallow groove on the interior of the counterbored portion 17 of the cage. The pinion shaft 14 is threaded to receive a nut 22 by which the bearing 16 may be adjusted, and the usual lock washer 23 and lock nut 24 are provided for locking the adjusting nut 22. Exteriorly of the threaded portion for receiving the nuts 22 and 24, the shaft is suitably formed to receive means for connecting it with the propeller shaft.

The means for adjusting the cage 13, with which the present invention is particularly concerned, comprises a ring nut 25 which is threaded upon the exterior of the housing extension 11. The cage 13 is formed with a radial flange 26 for engagement by the ring nut, such flange being provided with a number of circumferentially spaced bosses 27 to receive screws 28 which pass therethrough and are threaded into a clamping ring 29 which surrounds the ring nut 25. At circumferentially spaced points, the ring nut is partially split, as shown at 30 in Fig. 1, and that portion of its peripheral surface remote from the flange 26 is conical, as shown at 31. The interior surface of the clamping ring 29 is machined to conform to the outer surface of the ring nut, so that when the clamping ring is moved axially, by means of the screws 28, the coacting conical surfaces will clamp the ring nut 25 against the housing extension 11 and the flange 26 against the ring nut, whereby the parts will be firmly held in adjusted position. The ring nut 25 is provided with suitable teeth 32 for engagement by a spanner wrench or other instrument to facilitate its rotation.

When it is desired to adjust the position of the pinion relatively to the gear with which it cooperates, the cage 13 may be adjusted by loosening the screws 28, rotating the ring nut 25 to the desired position, and tightening the screws 28 to secure the parts as above described. Since the teeth 32 and screws 28 are on the exterior of the housing, they are in full view and readily accessible. It will also be noted that access may be had to the adjusting nut 22, without the removal of any parts, if it is desired to adjust the bearings of the shaft 14, without removing the cage 13 from the housing extension.

Since the ring 19 is mounted between the bearing 16 and adjusting nut 22, it will rotate with the shaft 14, while the packing ring 18 will be held stationary by reason of its engagement with the counterbored portion 17 of the cage and with the washer 20. As the surface of the packing ring becomes glazed by the friction of the ring 19, it will be evident that any tendency for the lubricant to seep between the flange 19ª and the packing will be effectively prevented by the centrifugal action due to the rotation of the ring 19.

While I have illustrated and described what I now consider to be a preferred form of structure embodying my invention, it is understood that the principles of the invention are not limited to the details of construction shown and described, but that changes may be made in such details, without departing from the spirit of the invention which is defined in the appended claims.

Having thus described my invention, what I claim is:—

1. In a driving axle, the combination of a housing comprising an extension having an opening for a pinion shaft, a cage for carrying said shaft and its bearings and having a shoulder thereon, a ring nut surrounding said extension and cooperating with said shoulder to adjust the position of said cage, and means for securing said ring nut in adjusted position.

2. In a driving axle, the combination of a housing comprising an extension having an opening for a pinion shaft, a cage for carrying said shaft and its bearings and having a shoulder thereon, a ring nut surrounding said extension and cooperating with said shoulder to adjust the position of said cage, and means for clamping said cage relatively to said ring nut.

3. In a driving axle, the combination of a housing comprising an extension having an opening for a pinion shaft, a cage for carrying said shaft and its bearings and having a shoulder thereon, a split ring nut on said extension cooperating with said shoulder to adjust the position of the cage, and means cooperating with said cage for clamping said ring nut against said extension to secure the cage against movement axially relative to said extension.

4. In a driving axle, the combination of a housing comprising an extension having an opening therein, a cage fitting in said opening, a pinion shaft and bearings therefor mounted in said cage, said cage having a radially extending flange thereon, a ring nut surrounding said extension and cooperating with said flange to adjust the position of said cage, and means clamping said flange against said ring nut and said ring nut against said extension to secure said cage against axial movement in either direction.

5. In a driving axle, the combination of a housing comprising an extension open at its outer end and having a cylindrical surface, a cage fitting therein and having a radially projecting flange adjacent its outer end, a pinion shaft and bearings assembled as a unit with said cage, a split ring nut surrounding said extension and adjustable thereon, a clamping ring surrounding said ring nut, said ring and said nut having cooperating conical surfaces, and screws cooperating with said ring and said flange to clamp said ring nut therebetween.

6. In a driving axle, the combination of a housing comprising an extension open at its outer end and having a cylindrical surface, a cage fitting therein having an outwardly extending flange, a pinion shaft and bearing assembled as a unit with said cage, means on said shaft between said adjusting means and said bearing and adapted to close the outer end of said cage, an adjusting ring threaded on said extension, a second ring surrounding said adjusting ring, said rings having cooperating conical surfaces, and threaded members for clamping said adjusting ring between said second ring and said flange.

7. In a driving axle, the combination of a housing comprising an extension open at its outer end and having a cylindrical surface, a cage fitting therein and having a radially projecting flange adjacent its outer end, a pinion shaft and bearings assembled as a unit with said cage, a split ring nut surrounding said extension and adjustable thereon, a clamping ring surrounding said ring nut, said ring and said flange each having peripheral lugs and screws cooperating with said lugs to hold said flange in engagement with said ring nut and clamp said ring nut in adjusted position.

8. In a driving axle, the combination of a housing comprising an extension having an opening for a pinion shaft, a cage for carrying said shaft and its bearings and having a shoulder thereon, and a ring nut surrounding said extension cooperating at one edge with said shoulder to adjust the position of said cage and having teeth on its other edge for engagement by an operating tool.

9. In a driving axle, the combination of a housing comprising an extension having an opening for a pinion shaft, a cage for carrying said shaft and its bearings and having a flange thereon, a ring nut threaded on said extension, and means for holding said flange in engagement with said ring nut comprising screws passing through said flange, said ring nut having teeth on that edge thereof remote from said flange for engagement by an operating tool.

10. In a device of the class described, the combination of a housing open at one end, a shaft, a bearing for said shaft seated in said housing, means on said shaft for adjusting said bearing, a collar on said shaft between said bearing and said adjusting means, said collar having a flange thereon, a packing ring fitting in said housing and engaging that side of said flange adjacent the open end of the housing, and means removably mounted in said housing for securing said packing ring in position.

11. In a driving axle, the combination of a housing comprising an extension having an opening for a pinion shaft, a cage for carrying said shaft and its bearings and having a flange thereon, a ring nut cooperating with said extension and said flange to position said cage axially, and means for securing said ring nut and said cage in adjusted position.

12. In a driving axle, the combination of a housing comprising an extension having an opening for a pinion shaft, a cage for carrying said shaft and its bearings and having a flange thereon, a ring nut cooperating with said extension and said flange to position said cage axially, and screws cooperating with said flange to secure said cage in position.

13. In a driving axle, the combination of a housing comprising an extension having an opening for a pinion shaft, a cage for carrying said shaft and its bearings and having a flange thereon, a ring nut cooperating with said extension and said flange and having a threaded connection with one of the same whereby said cage may be adjusted axially by means of said nut, and means for securing said cage and said nut in adjusted position.

14. In a driving axle, the combination of a housing comprising an extension having an opening for a pinion shaft, a cage for carrying said shaft and its bearings and having a flange thereon, a ring nut cooperating with said extension and said flange and having a threaded connection with one of the same whereby said cage may be adjusted axially by means of said nut, and bolts engaging said flange and adapted to clamp said cage and said nut in adjusted position.

15. In a driving axle, the combination of a housing comprising an extension open at its outer end and having a cylindrical bore, a cage fitting in said bore and having a radially extending flange arranged outside said extension, a pinion shaft and bearings assembled as a unit with said cage, a ring nut cooperating with said flange and said extension, to position said cage axially, and bolts arranged parallel to said shaft and extending through said flange to secure the cage in adjusted position.

16. In a driving axle, the combination of a housing comprising an extension open at its outer end and having a cylindrical bore, a cage fitting in said bore and having a radially extending flange arranged outside said extension, a pinion shaft and bearings assembled as a unit with said cage, a ring nut cooperating with said flange and said extension, and having threaded connection with one of the same to position said cage axially of said shaft, and means for securing said cage and said ring nut in adjusted position.

17. In a driving axle, the combination of a housing comprising an extension open at its outer end and having a cylindrical bore, a cage fitting in said bore and having a radially extending flange arranged outside said extension, a pinion shaft and bearings assembled as a unit with said cage, an internally threaded ring nut to position said cage axially, said ring nut cooperating with said flange and said extension, having threaded connection with one and having one of its ends bearing upon the other, and means for securing said cage and said nut in position.

18. In a driving axle, the combination of a housing comprising an extension open at its outer end and having a cylindrical bore, a cage fitting in said bore and having a radially extending flange arranged outside said extension, a pinion shaft and bearings assembled as a unit with said cage, an internally threaded ring nut to position said cage axially, said ring nut cooperating with said flange and said extension, having threaded connection with one and having one of its ends bearing upon the other, and bolts arranged parallel to said shaft and extending through said flange to secure said cage and said ring nut in position.

In testimony whereof I affix my signature.

THOMAS ZIMMERMAN.